US012358773B2

(12) United States Patent
Viggato et al.

(10) Patent No.: US 12,358,773 B2
(45) Date of Patent: Jul. 15, 2025

(54) BEVERAGE DISPENSING AND SANITIZING SYSTEM

(71) Applicants: Jason Charles Viggato, Las Vegas, NV (US); Gerardo Ernest Colucci, Las Vegas, NV (US); Alex Francis Stokes, Jr., Henderson, NV (US)

(72) Inventors: Jason Charles Viggato, Las Vegas, NV (US); Gerardo Ernest Colucci, Las Vegas, NV (US); Alex Francis Stokes, Jr., Henderson, NV (US)

(73) Assignee: Sparkle365 Holdings LLC, Las Vegas, NV (US)

( * ) Notice: Subject to any disclaimer, the term of this patent is extended or adjusted under 35 U.S.C. 154(b) by 0 days.

(21) Appl. No.: 18/395,211

(22) Filed: Dec. 22, 2023

(65) Prior Publication Data

US 2025/0206590 A1 Jun. 26, 2025

(51) Int. Cl.
*B67D 1/07* (2006.01)
*B67D 1/00* (2006.01)

(52) U.S. Cl.
CPC ........ *B67D 1/07* (2013.01); *B67D 2001/0093* (2013.01); *B67D 2001/075* (2013.01)

(58) Field of Classification Search
CPC .. B08B 5/00; B08B 5/02; B08B 5/023; B08B 5/026; B67D 1/07; B67D 2001/0093; B67D 2001/075
See application file for complete search history.

(56) References Cited

U.S. PATENT DOCUMENTS 4,270,673 A * 6/1981 Rodth .................. B67D 1/0044 222/129.3
10,822,219 B2 11/2020 Katz et al.
2004/0118291 A1* 6/2004 Carhuff ................. A47J 31/469 99/275

(Continued)

FOREIGN PATENT DOCUMENTS

CA 3058224 A1 * 6/2020 ............ A47J 31/605
CN 104709867 A * 6/2015

(Continued)

OTHER PUBLICATIONS

Soda Gun Jetter LLC; Soda Gun Jetter: The Premier Bar Soda Gun Cleaning System; retrieved from https://www.sodagunjetter.com on Mar. 16, 2023; 11 pages.

(Continued)

*Primary Examiner* — Bob Zadeh
(74) *Attorney, Agent, or Firm* — Jeffrey G. Sheldon; Cislo & Thomas LLP

(57) ABSTRACT

A system for cleaning a beverage dispenser that has a nozzle for receiving a beverage and a sanitizing fluid as a housing. The housing has an outer wall and inner wall with annular flow path between the walls. There is a central flow path through the nozzle and a connection for fluid flow of sanitizing fluid between the central flow path and the annular flow path. The nozzle also has inlet for introduction of the sanitizing fluid. The system can be provided with a controller for controlling temperature, pressure and flow rate of the sanitizing fluid, the controller including memory for storing information when sanitization occurred.

12 Claims, 12 Drawing Sheets

(56) References Cited

U.S. PATENT DOCUMENTS

| | | | | |
|---|---|---|---|---|
| 2007/0140046 | A1* | 6/2007 | Serafin | B01F 25/23 366/162.4 |
| 2009/0014464 | A1* | 1/2009 | Adbelmoteleb | B67D 1/0028 222/1 |
| 2011/0315711 | A1* | 12/2011 | Hecht | B67D 1/0895 222/144.5 |
| 2015/0102062 | A1* | 4/2015 | Mosimann | B67D 1/0022 222/129.1 |
| 2017/0129760 | A1* | 5/2017 | Aneson | B08B 9/00 |
| 2018/0086620 | A1* | 3/2018 | Smith | B67D 1/0084 |
| 2018/0111168 | A1* | 4/2018 | Aneson | B08B 9/027 |
| 2021/0316979 | A1* | 10/2021 | Hayes-Pankhurst | B67D 1/0037 |
| 2022/0402743 | A1 | 12/2022 | Smith et al. | |

FOREIGN PATENT DOCUMENTS

| | | | | | |
|---|---|---|---|---|---|
| CN | 114746240 | A | * | 7/2022 | B29C 45/1603 |
| CN | 116714184 | A | * | 9/2023 | |
| DE | 102019109309 | A1 | * | 10/2020 | |
| FR | 2462387 | A1 | * | 2/1981 | |
| GB | 2542601 | B | | 3/2017 | |
| JP | 2010000501 | A | * | 1/2010 | B01D 29/15 |
| TW | 201306347 | A | * | 2/2013 | H01L 51/5253 |
| WO | 2013034190 | A1 | | 3/2013 | |
| WO | WO-2021132351 | A1 | * | 7/2021 | B05B 3/10 |

OTHER PUBLICATIONS

PCT/US2024/061008. International Search Report dated Jan. 28, 2025. 55 pages.

* cited by examiner

BEVERAGE DISPENSING AND SANITIZING SYSTEM

BACKGROUND

Beverage dispensing systems are well known. One example is a soda fountain with multiple dispensers, each having a lever, such as the type found in fast food restaurants. Another type is a dispensing gun of the type used by bartenders, where the gun has multiple buttons for dispensing different beverages. There are also beer dispensers.

Information regarding dispensing systems can be found in the following references:

a. US2022402743
b. WO13034190
c. GB2542601
d. Soda Gun Jetter Model SGT-200

A problem with many dispensing systems is how to keep them clean and sanitized. Proper sanitization requires dependable labor to thoroughly and periodically sanitize, and such labor is not always available. Another problem is to thoroughly sanitize a system, particularly O-rings and lines, which can be difficult or sometimes impossible to access.

Accordingly, there is a need for a sanitizing system for beverage dispensing systems which are dependable, thorough, and easy to use.

SUMMARY

The present invention is directed to a system for cleaning and preferably sanitizing a beverage dispenser, where the dispenser comprises a nozzle for receiving at least one beverage and a sanitizing fluid. Preferably the nozzle comprises a housing having an outer wall and an inner wall with an annular flow path between the walls, a central flow path through the nozzle, and a connection for fluid flow of the sanitizing fluid between the central flow path and the annular flow path. The nozzle also has an inlet for introduction of the sanitizing fluid. Typically, the sanitizing fluid is a liquid.

A heater is provided for heating sanitizing liquid before reaching the nozzle inlet.

In a preferred automated system, there is a controller for controlling the heater where the system comprises a temperature sensor for sensing the temperature of the sanitizing liquid. The temperature sensor can provide an output to the controller based on the sensed temperature.

In addition, the system typically has a pump for pumping sanitizing liquid from a sanitizing liquid source to the nozzle. There can be, a controller for controlling the pump, and a flow rate sensor for sensing the flow rate of the sanitizing liquid. The flow rate sensor is capable of providing an output to the controller based on the sensed flow rate. Also there can be a pressure sensor for sensing the pressure of the sanitizing liquid, the pressure sensor being capable of providing an output to the controller based on the sensed pressure.

Preferably the system comprises an interlock and sensor for preventing sanitizing fluid flow into the nozzle when the nozzle is not engaged to receive sanitizing fluid.

As noted, beverage dispensers typically have an O-ring to provide a seal for avoiding liquid leakage. The sanitizing fluid flows in the nozzle to sanitize the O-ring by contacting the O-ring.

In a "gun" type beverage dispensing system there is provided a holster supporting the gun including the nozzle. The holster can have a drain outlet for discharge of sanitizing fluid from the nozzle. The holster can comprise a drain outlet for discharge of sanitizing fluid from the nozzle and a nozzle inlet for introduction of sanitizing fluid into the nozzle.

In a version of the invention used with a fountain system, there are a plurality of nozzles with a valve for each nozzle for allowing and preventing beverage from flowing into the respective nozzle. Preferably there is a pressure plate for opening all of the valves simultaneously when utilizing the sanitizing fluid.

The system has a controller and a valve system so that beverage or the sanitizing liquid can be provided to the nozzle, but not both.

Preferably the controller includes memory for storing information about when the sanitizing liquid valve was open for allowing the sanitizing liquid to sanitize and the conditions during sanitation including pressure, temperature, and flow rate.

In use of the system, sanitizing liquid is pressured into the nozzle inlet tor nozzle outlet for flow through both the central flow path and the annular flow path.

Thus the present invention provides a system that can be automated for thorough and timely sanitizing and cleaning a beverage dispensing system.

DRAWINGS

These and other features, aspects, and advantage of the present invention will become better understood with regard to the following description, the appended claims, and accompanying drawings where:

DESCRIPTION

Figure 1:
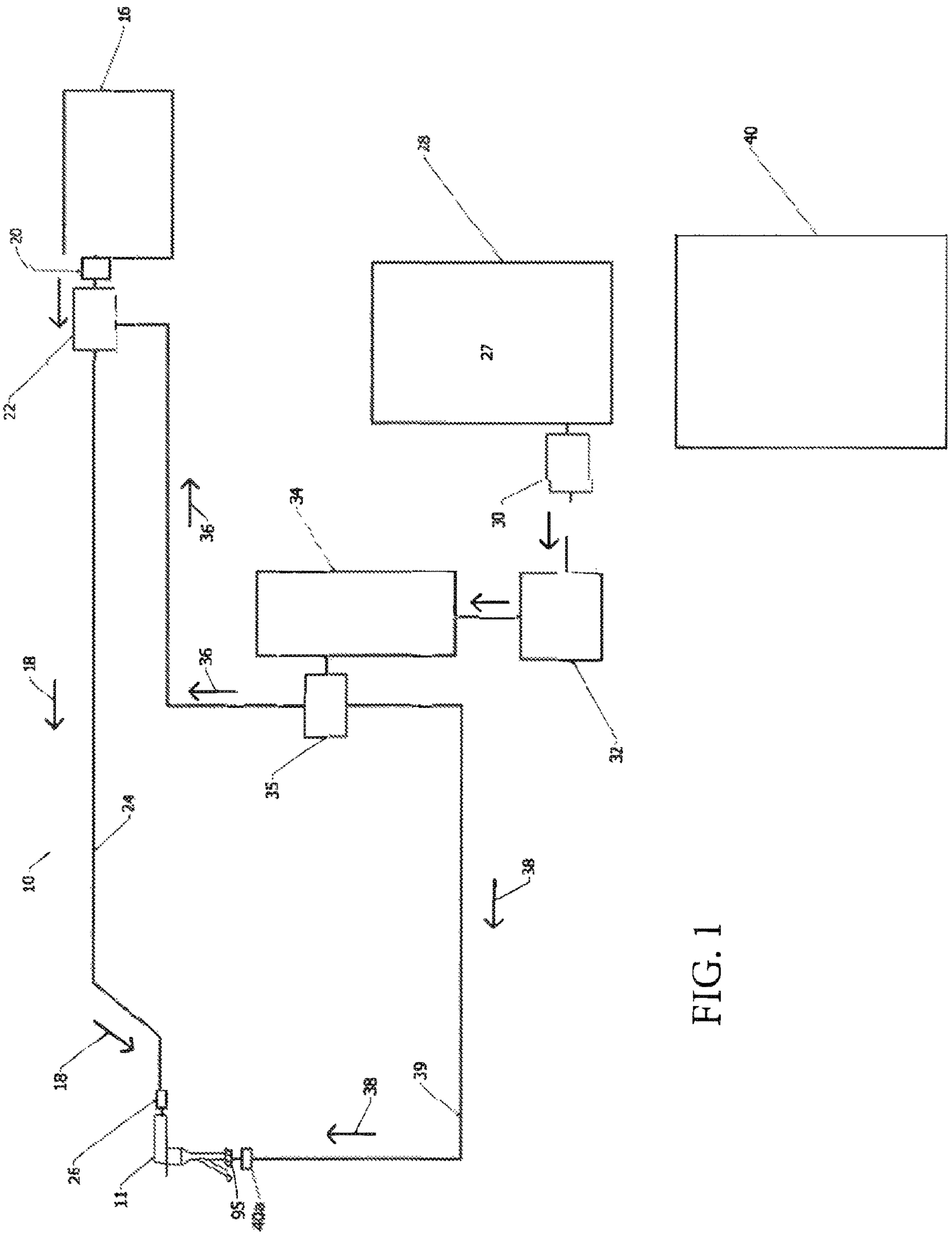
FIG. 1 is a flow chart of a beverage gun system having features of the present invention.
Figure 2:
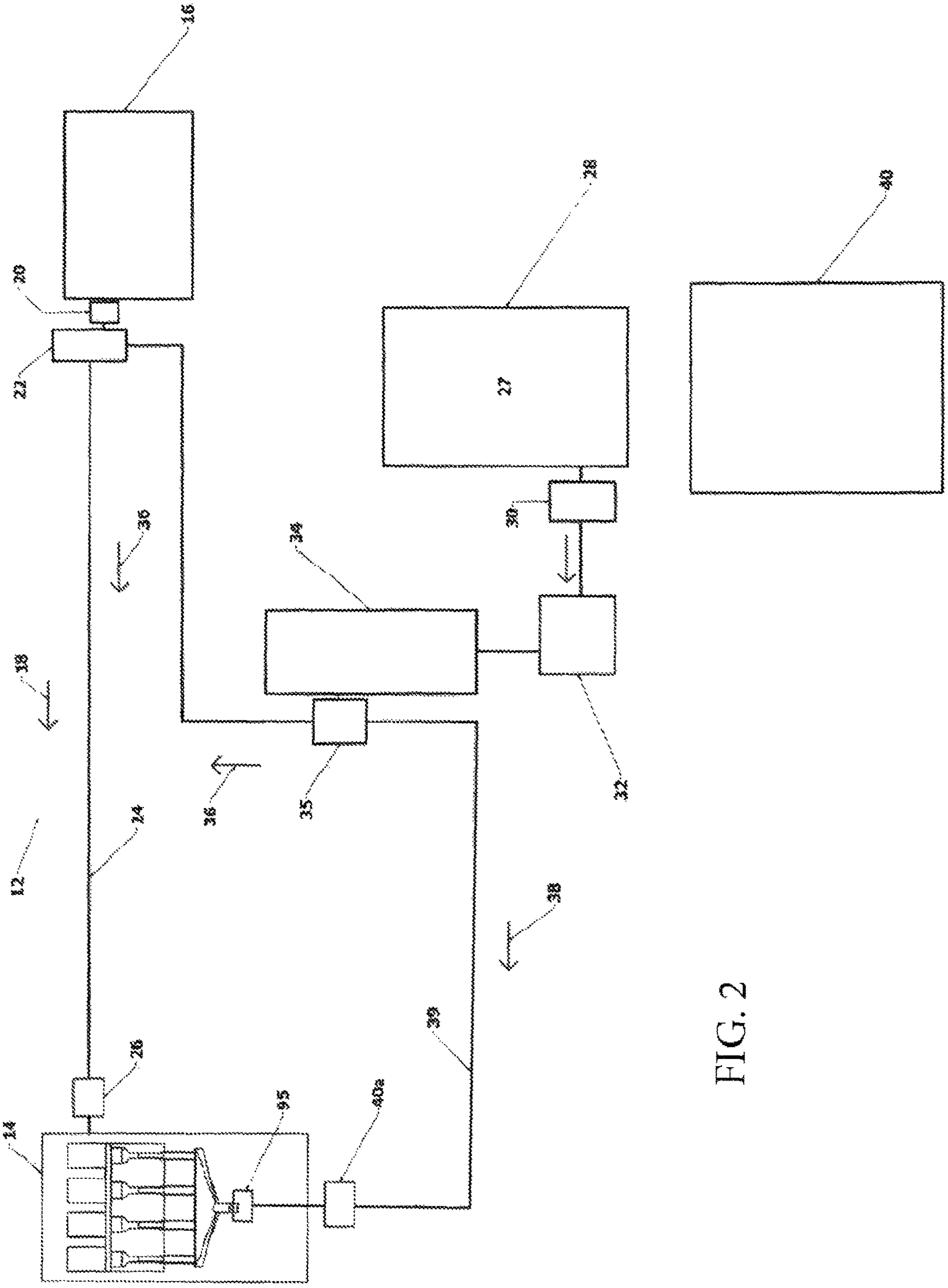
FIG. 2 is a flow chart of a fountain system having features of the present invention adapted for use in a soda fountain machine.
Figure 7:
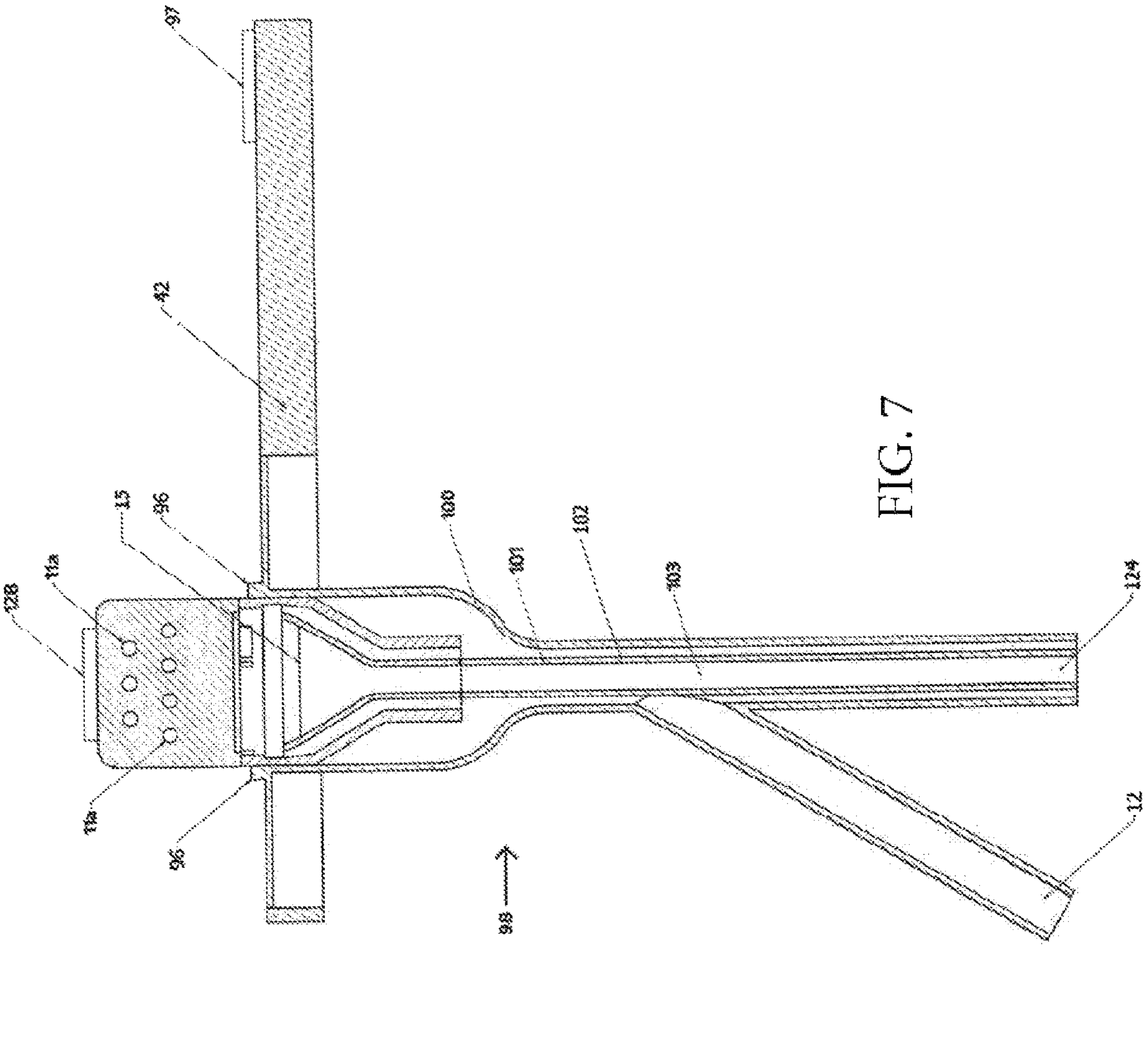
FIG. 7 is a front elevation view, partly in section, of a soda gun dispensing system having features of the present invention including a holster for the soda gun.
Figure 8:
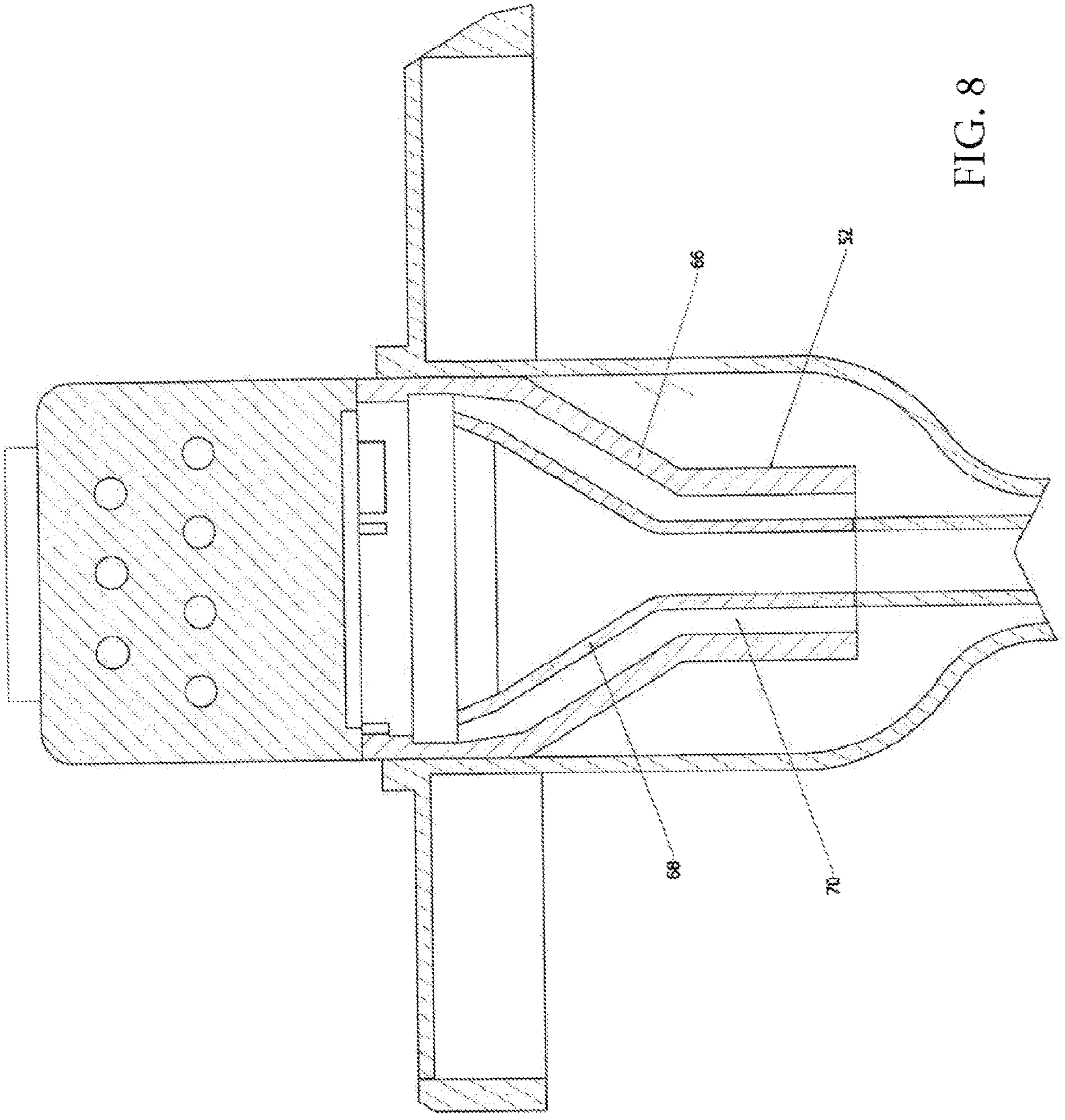
FIG. 8 is a front elevation view of a portion of the system of FIG. 7.

With reference to FIG. 1, there is shown a beverage dispensing system 10 utilizing a soda gun 11, the system having features of the present invention. The soda gun 11 has buttons 11*a* (FIGS. 7 and 8) for selecting which beverage to dispense. FIG. 2 shows a substantially similar system 12 differing in having a soda fountain dispenser 14 rather than the soda gun 11. Each system includes a unique nozzle as described below. So portions of the following description are applicable to both systems 10 and 12.

Both systems 10 and 12 dispense at least one beverage and can be sanitized with a sanitizing fluid. Although the present invention is discussed with regard to dispensing soda as the beverage, the present invention can be used with other beverages such as beer, tea, lemonade, and seltzer water.

Each system 10 and 12 includes a beverage source 16 such as a bag containing syrup. There can be more than one beverage source 16. Arrows 18 show the direction of flow of beverage from the beverage source 16 to the gun 11 or the soda fountain dispenser 14. Beverage flows from the beverage source 16 through a check valve 20 for preventing backflow, and then through an electronically controlled on/off source valve 22 through line 24, by sensors 26, and to the gun 11 or fountain 14 for dispensing.

Conventional sanitizing liquids used for cleaning beverage dispensers can be used in these systems. A sanitizing fluid 27 such as Foxx brand Superflush tap and line cleaner, Kegworks (trademark) beer line cleaning solution, or Kay (brand) 5 Sanitizer/Cleaner, is stored in a vessel 28, also referred to as a chamber. The sanitizing fluid 27 is generally a liquid.

Downstream of the vessel 28 is a sanitizing liquid outlet valve 30, which is electronically controlled, which can be opened to let sanitizing liquid out. Either the source outlet valve 22 or sanitizing liquid outlet valve 30 is open, but both are not open at the same time. Both valves can be closed at the same time. Sanitizing liquid flows through the outlet valve 30 to a pressuring device such as a pump 32 and then into a heater 34, wherein the sanitizing liquid is pumped to a desired pressure for controlling sanitizing fluid flow rate and heated to a desired temperature such as 80 to 110 degrees F. A typical flow rate for the sanitizing liquid is 0.2 to 2 gpm (gallons per minute), and usually 0.25 to 1.5 gpm. The desired pressure is also referred to as a target pressure; the desired temperature is also referred to as a target temperature.

From the heater 34 sanitizing fluid flows into a directional valve 35 which controls flow direction. Flow forwardly is shown by arrows 36 and reverse flow is shown by arrows 38. Flow forwardly includes flow through the same line 24 used for the beverage. Reverse flow is through line 39. The sanitizing liquid cleans and sanitizes the system lines and the gun 11 in FIG. 1 or fountain 14 in FIG. 2.

A controller 40 is in communication with the valves 22, 30 and 35 and pump 32 and heater 34 for controlling them. The controller 40 receives input from the sensor 26 and a sensor 40*a* in line 39 downstream from the soda gun 11 or soda fountain dispenser 14. The sensors 26 and 40*a* which can be for sensed pressure, flow rate and/or temperature, for effective use of the sanitizing liquid 27. Thus the sensors provide output to the controller 40 to have at least one of the temperature, flow rate, and pressure of the sanitizing fluid at the target temperature, the target flow rate, and the target pressure. The controller 40 also controls the valves 22, 30, and 35 for controlling if beverage is dispensed or there is a cleaning/sanitizing cycle, and the direction of flow of the sanitizing liquid, i.e. reverse or forward flow. Forward flow means the sanitizing fluid flows in the same direction as beverage enters a nozzle. Reverse flow means the sanitizing fluid flows in a direction opposite as beverage enters a nozzle.

Suitable flow and pressure sensors are I0T Flow Sensors/IoT Pressure Sensors under the model number E8FC/E8PC from Omron Electronics LLC located in Hoffman Estates, IL Another suitable flow rate sensor is available from IFN USA located in Malvern, PA under the model number US0022. A suitable temperature sensor is available from National Control Devices, LLC (NCD) in Osceola MISSOURI under Model Number RTS PT 100.

The controller 40 includes memory that is built in or can be separate. The memory can be any of the type typically used with computer systems such as solid state memory, magnetic storage medium, optical storage medium, flash memory and other machine readable medium for storing information. Among the information that can be stored and recovered is when and how long sanitizing liquid was used, how much liquid was used, and the temperature, pressure, and flow rate of the sanitizing liquid. Also the controller can provide prompts to a user for timely implementing a sanitizing cycle. The controller can include a display for displaying information to a user, as well as prompts. Also the controller 40 can be used with a remote device such as an iPhone phone with an app, and the remote device can be used for display of information and a visible prompt, and also provide an aural prompt.

Figure 2A:
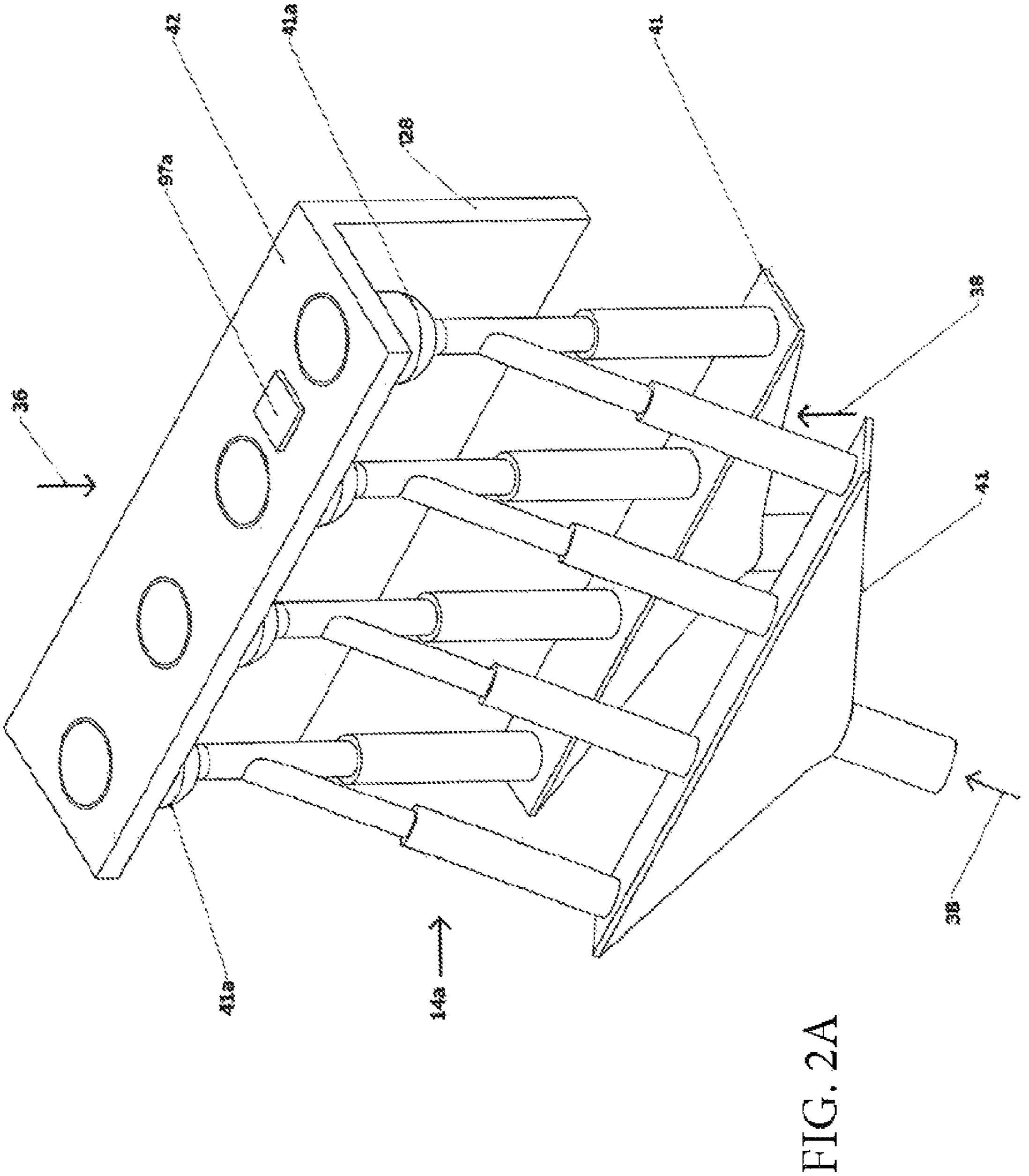
FIG. 2A is a close-up perspective view of a cleaning attachment for the fountain system of FIG. 2.

A typical soda fountain cleaning attachment 14*a* for the fountain dispenser 14, as shown in FIG. 2A, can accommodate four different beverages, but as is typical, soda fountain dispensers can be provided for a different number of beverages, such as six or eight different beverages.

Two manifolds 41, as shown in FIG. 2A, are provided for introducing sanitizing liquid 27, where the choice of manifold is used for introducing sanitizing liquid depends on the desired direction of flow through the system, as described below.

Figure 3:
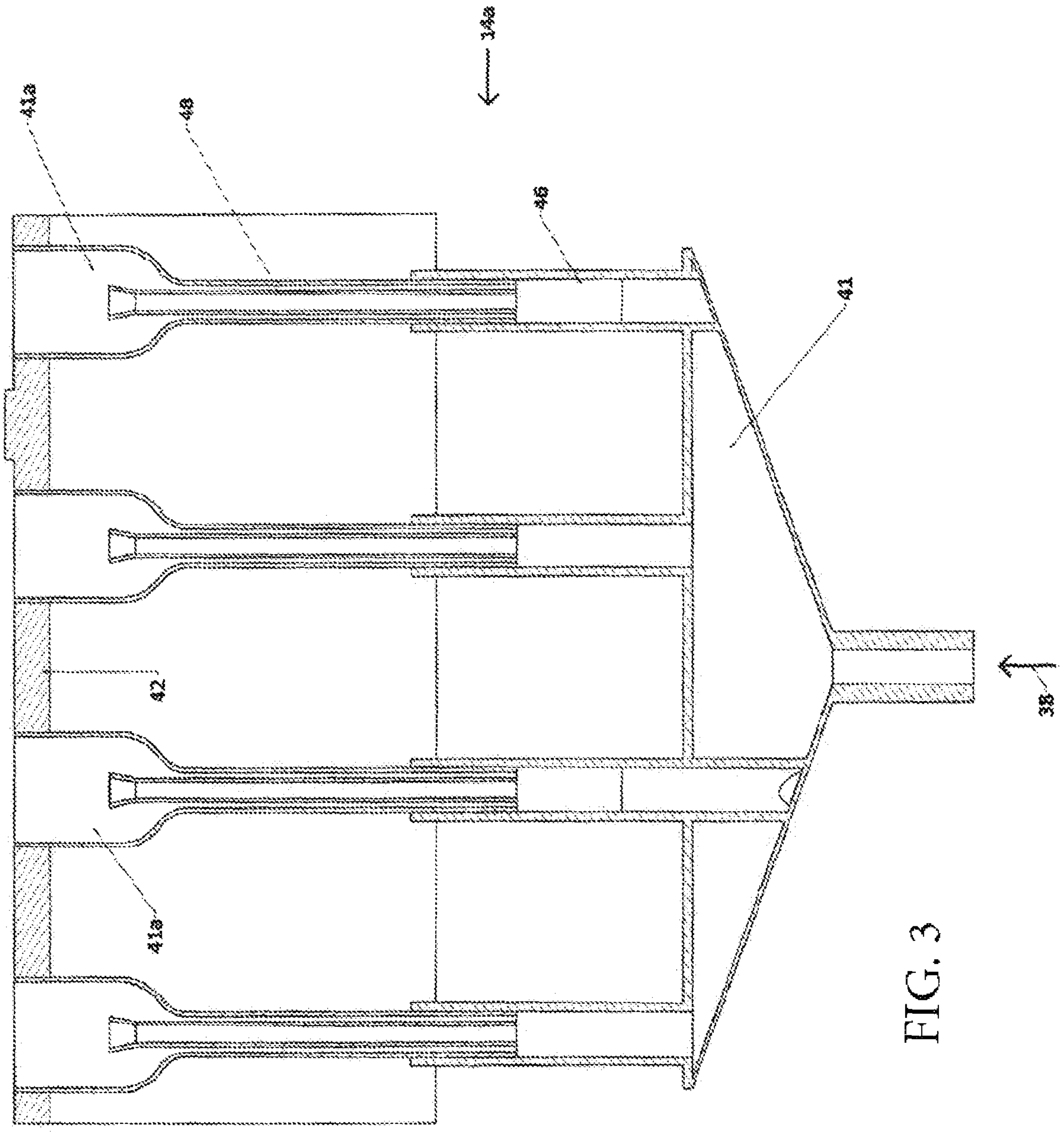
FIG. 3 is a front elevation view of the cleaning attachment of FIG. 2A.

Each beverage dispenser has at least one nozzle assembly 15 (FIGS. 4 and 6) which when the system is in a cleaning mode, sits in a seat 41*a* (FIG. 3) of the cleaning attachment 14*a*. A single support 42, such as an elongated plate, is provided for the nozzle assemblies 15. Each manifold 41 has pipe extensions 46 that are compression fitted over a respective discharge line 48 for sanitizing fluid from each respective nozzle assembly 15.

Figure 6:
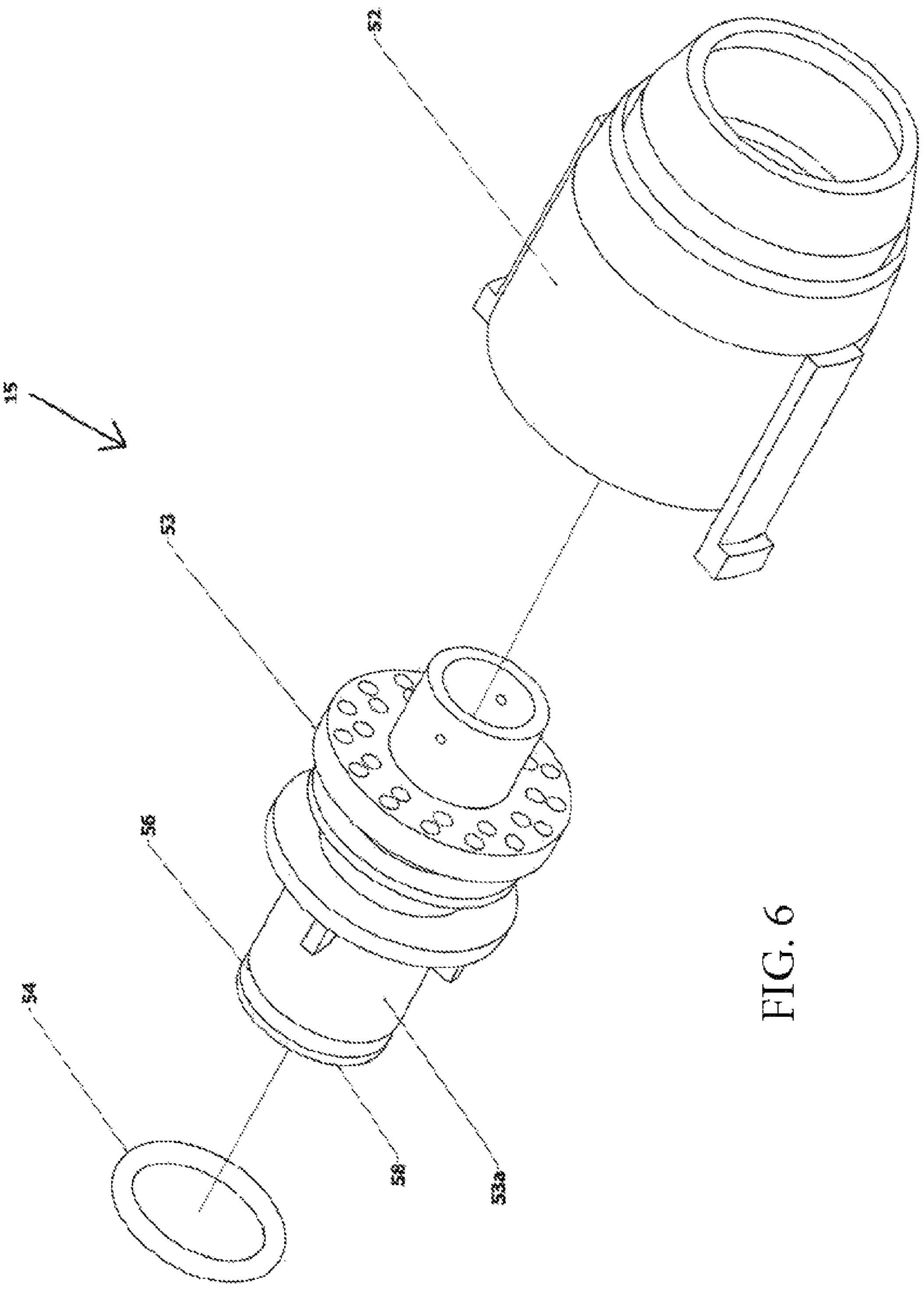
FIG. 6 is an exploded perspective view of a soda fountain system nozzle assembly for use in the system of FIG. 2.

With regard to FIG. 6, each nozzle assembly 15 comprises the aforementioned nozzle, namely nozzle 52, a spindle diffuser 53 with a diffuser body 53*a* that fits into the nozzle 52 with an O-ring 54 for the spindle body 53*a* in a groove 56 in an upper section 58 of the spindle diffuser 53.

Figure 4:
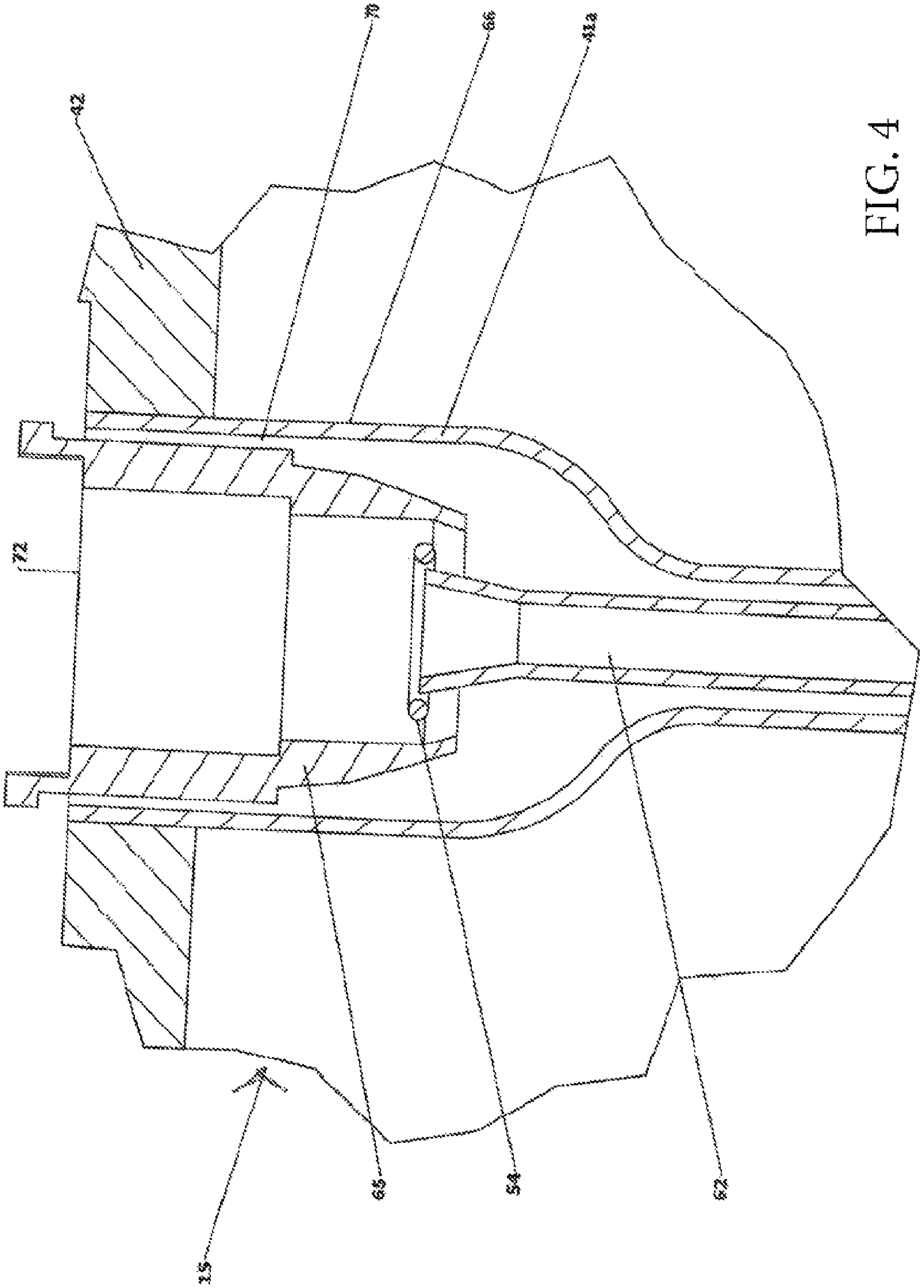
FIG. 4 is a front elevation view, partly in section, of a nozzle seated in the attachment of FIG. 3.
Figure 5:
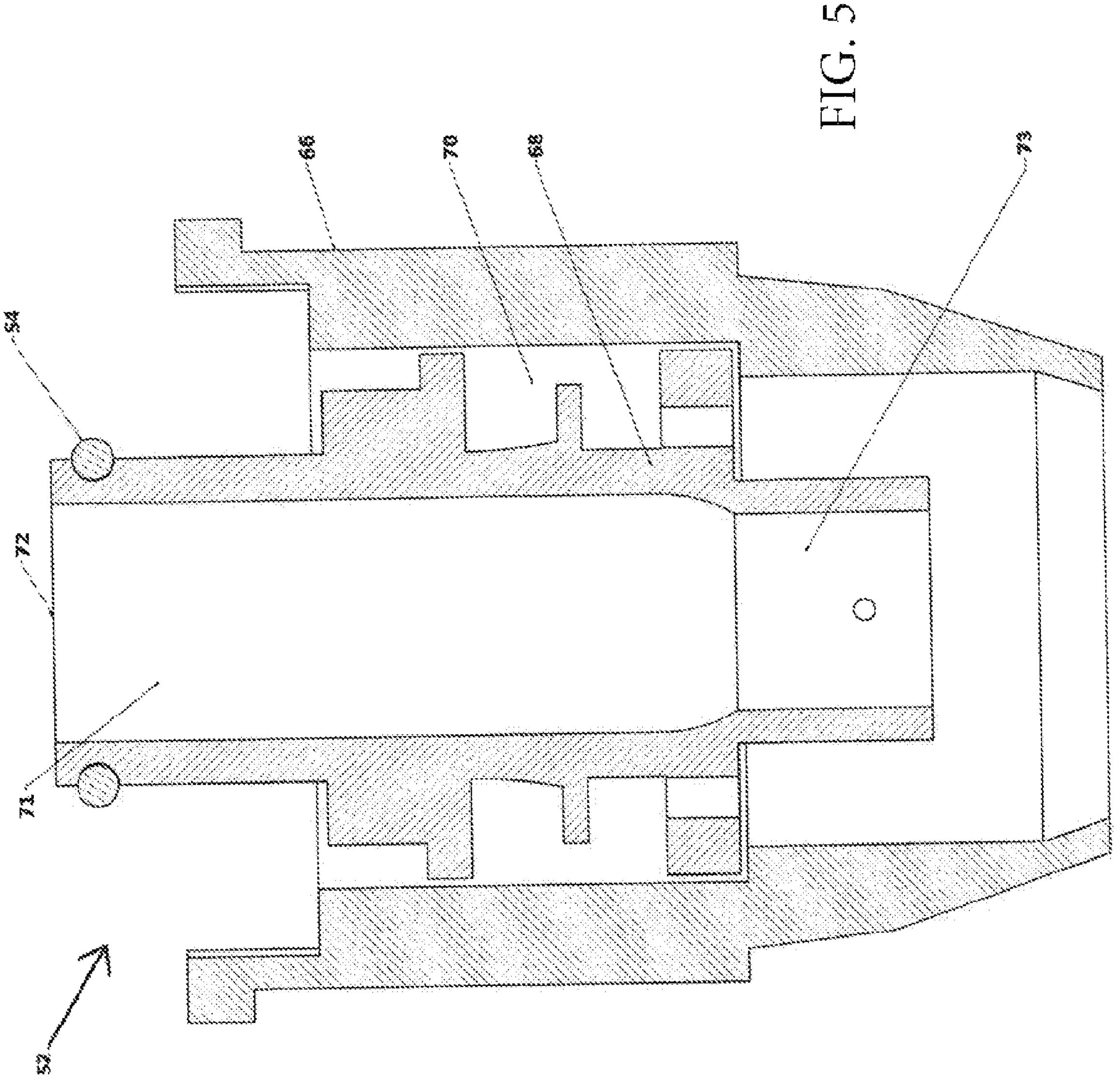
FIG. 5 is a vertical sectional view of the nozzle shown in FIG. 4 for use in the system of FIG. 2.
Figure 9:
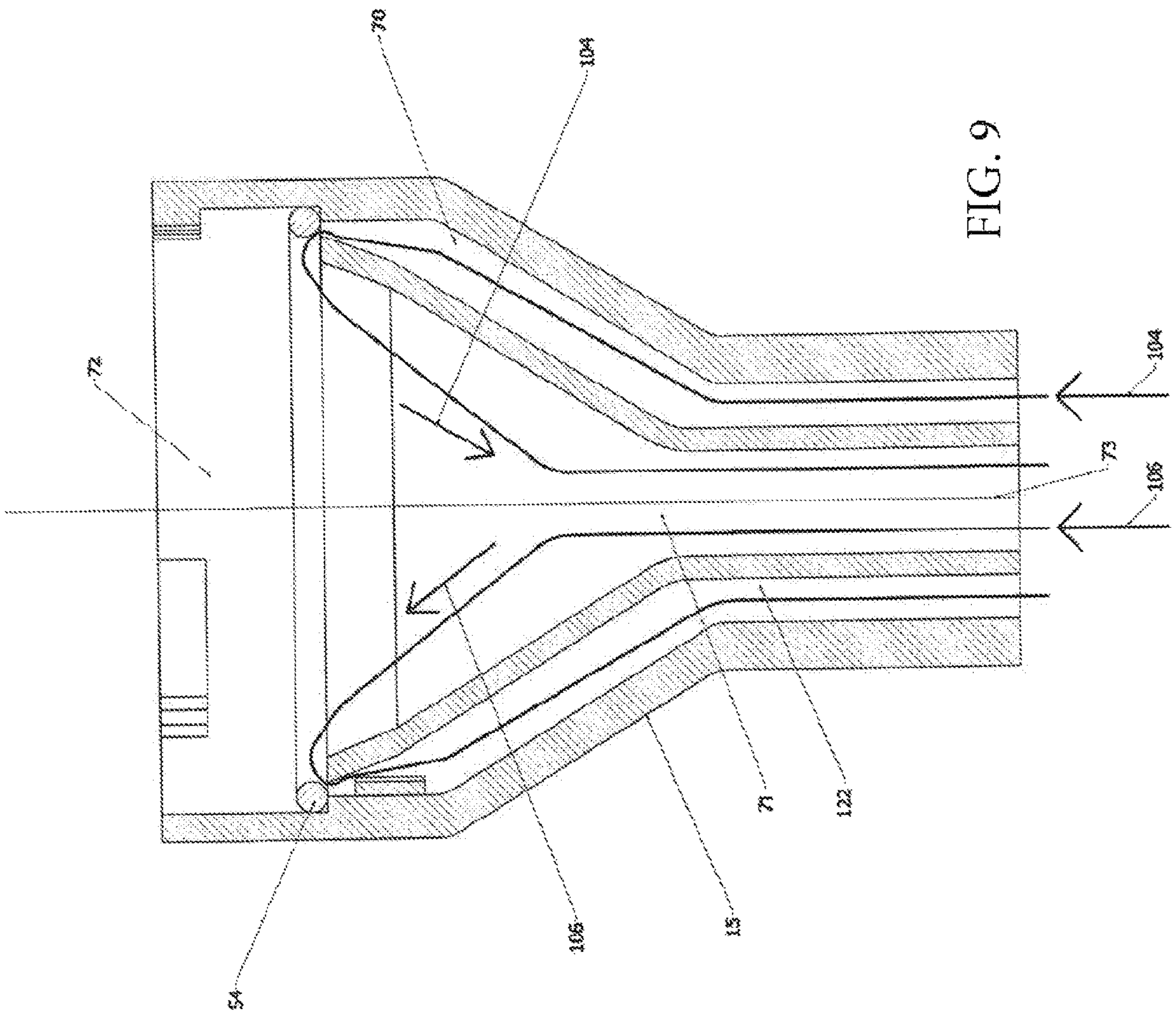
FIG. 9 is a front elevation view, partly in section, showing flow of cleaning fluid in a nozzle having features of the present invention.

With reference to FIGS. 4, 5 and 9, the nozzle 52 has an outer wall 66 and an inner wall 68 with an annular flow path 70 between the walls 66 and 68. There is a central flow path 71 down through the nozzle, with an inlet 72 and an outlet 73 for forward flow, and sanitizing liquid can flow from the central flow path 71 with 73 as the inlet and exiting the annular flow path 70. The inlet 72 used for the beverage can be used for introduction of the sanitizing fluid into each nozzle assembly 15 or there can be reverse flow by introduction of sanitizing fluid through the manifolds 41 or soda gun nozzle configuration. Arrows 104 show the half symmetry example of reverse flow for a soda gun nozzle starting in the outer annulus and exiting the central flow path for cleaning of the O ring. Arrows 106 show the half symmetry example of reverse flow for a soda gun nozzle starting in the central flow path and exiting the annulus for cleaning of the soda gun nozzle diffuser face.

Figure 11:
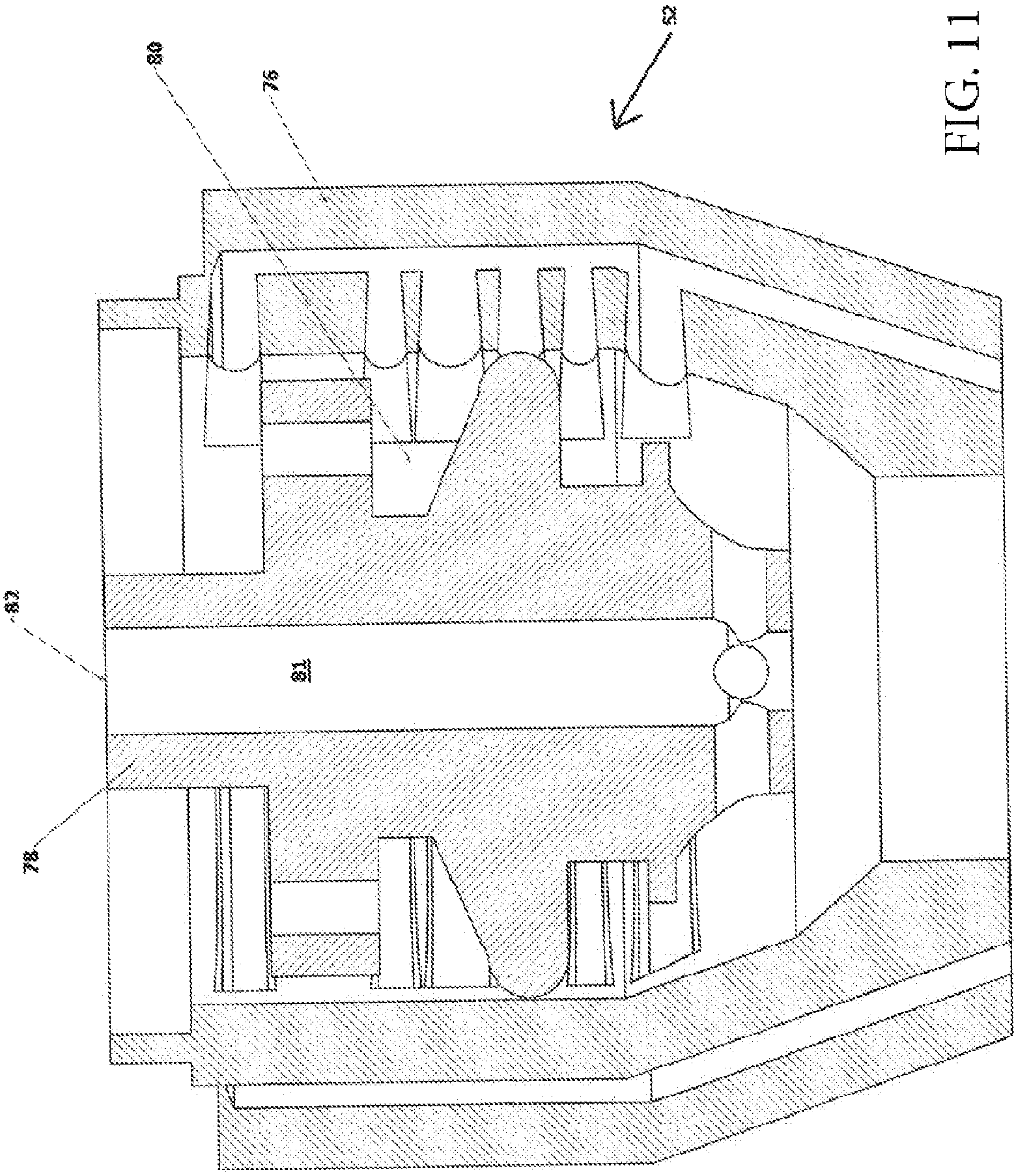
FIG. 11 is a vertical section view of a nozzle for use in a soda fountain dispenser.

With reference to FIG. 11, a nozzle 74 that is useful for a soda fountain is shown. The nozzle 74 has an outer wall 76 and an inner wall 78 with an annular flow path 80 between the walls 76 and 78. There is a central flow path 81 down through the nozzle, and sanitizing liquid can flow between the central flow path 81 and the annular flow path 80. An inlet 82 used for the beverage can be used for introduction of the sanitizing fluid into the nozzle 74 or there can be reverse flow.

In addition to the first sensor 26, as noted above, the sensor **40*a* (see FIGS. 1 and 2) can be provided in the line 39 used for reverse sanitizing liquid flow. The sensors 26 and 40*a*** again can be pressure sensors, flow rate sensors, and/or temperature sensors.

A bottom valve 95 (FIGS. 1 and 2), which can be electronically controlled by the controller 40, is used for controlling the direction of sanitizing liquid flow, either up the annular flow path 70 or 80 and down the center, or up the center and down the annular flow path.

An interlock utilizing a pressure sensor 97 and mechanical lock 96 (see FIG. 7) for the soda gun on the support 42 is provided for preventing sanitizing fluid flow into the nozzles when the nozzles are not engaged to receive sanitizing liquid. A similar interlock pressure sensor **97*a* and mechanical lock (FIG. 2A) can be used on the attachment 14*a*. For example, the interlock prevents sanitizing liquid flow when the source valve 22** is open.

A holster 98 (FIGS. 7 and 8) is used for the soda gun 11. A holster is commonly used for a soda gun, but the holster 98 is adapted for use with the invention. The holster is supported by a support 42, also referred to as a holder. The holster has an outer wall 100 and an inner wall 101 with an annular flow path 102 between the walls 100 and 101. There is a central flow path 103 through the holster with an inlet 124. The drain 125 for exit of the sanitizing liquid is provided.

It is desirable for a system having multiple nozzles, such as a soda fountain machine 14 and soda gun with one nozzle and buttons for selection of beverage flow path in **11*a*, that all the nozzles and flow paths be cleaned simultaneously. For this purpose, a pressure plate 128 can be provided (see FIG. 2A and FIG. 7**) that opens all the nozzles and button flow paths simultaneously.

For forward flow of the sanitizing fluid, with reference to FIG. 9, sanitizing fluid can pass through the nozzle inlet 72 and out the outlet 73 through the central flow path 71 in a single pass. Optionally by opening or closing the valve 95, sanitizing liquid in reverse flow can flow upwardly through the annular flow path 70, wherein it can contact and sanitize the O-ring 54, and then downwardly through the middle via the central flow path 71. Alternatively sanitizing liquid can flow up through the middle and down through the annular flow path 70 as shown by 122 in FIG. 9. Sanitizing fluid is discharged through the drain outlet 125. Thus, the sanitizing liquid can have flow through the annular flow path and the middle flow path (or reverse).

Figure 10:
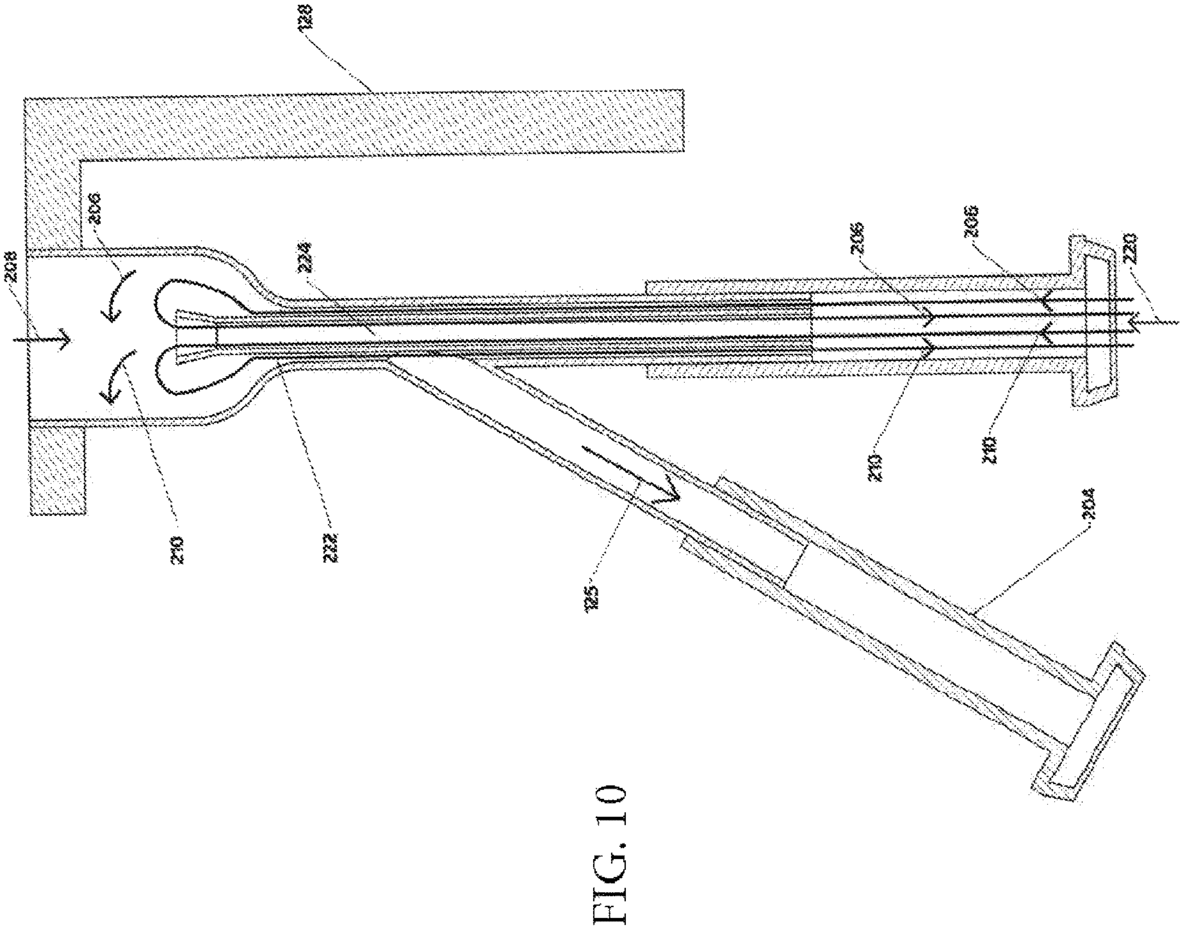
FIG. 10 is a front elevation view, partly in section, showing flow of cleaning fluid in the attachment of FIG. 2A.

With reference to FIG. 10, reverse and forward flow is shown for the cleaning attachment. The drain is a manifold attachment 204. Reverse flow is shown in half symmetry by arrows 206 from an inlet 220 upwardly through an annular path 222 and down central path 224 and arrow 125 out the drain 204, or by arrows 210 up central path 224 from an inlet 220 upwardly and down an annular path 222 and arrow 125 out the drain 204 and forward flow of the sanitizing fluid is shown by arrows 208 from an inlet down a central flow path 224 and arrow 125 out the drain 204.

Although the present invention is being described in considerable detail with reference to preferred versions, other versions are possible. Therefore, the scope of the appended claims should not be limited to description herein.

What is claimed is:

1. A system for cleaning a beverage dispenser comprising a nozzle for receiving at least one beverage and a sanitizing fluid, the nozzle comprising:

a) a housing having an outer wall and an inner wall with an annular flow path between the inner wall and the outer wall;

b) a central flow path through the nozzle;

c) a connection for fluid flow of the sanitizing fluid between the central flow path and the annular flow path;

d) an inlet for introduction of the sanitizing fluid; and e) an interlock utilizing a pressure sensor for preventing the sanitizing fluid flow into the nozzle when the nozzle is not engaged to receive the sanitizing fluid.

2. The system for cleaning a beverage dispenser of claim 1, further including a holster for the nozzle, the holster comprising a drain outlet for discharge of the sanitizing fluid from the nozzle and a nozzle inlet for introduction of the sanitizing fluid into the nozzle.

3. The system for cleaning a beverage dispenser of claim 1, further including a heater for heating the sanitizing fluid before it reaches the nozzle.

4. The system for cleaning a beverage dispenser claim 3, further including a controller for controlling the heater.

5. The system for cleaning a beverage dispenser of claim 4, further including a temperature sensor for sensing a temperature of the sanitizing fluid, the temperature sensor being capable of providing an output to the controller based on the sensed temperature.

6. The system for cleaning a beverage dispenser of claim 1, further including a pump for pumping the sanitizing fluid from a sanitizing fluid source to the nozzle.

7. The system for cleaning a beverage dispenser of claim 6, further including a controller for controlling the pump.

8. The system for cleaning a beverage dispenser of claim 7, further including a flow rate sensor for sensing a flow rate of the sanitizing fluid and being capable of providing an output to the controller based on the sensed flow rate.

9. A system for cleaning a soda gun dispenser comprising a nozzle for receiving at least one beverage and a sanitizing fluid;

wherein the nozzle comprises:

a) a housing having an outer wall and an inner wall with an annular flow path between the inner wall and outer wall;

b) a central flow path through the nozzle;

c) a connection for fluid flow of the sanitizing fluid between the central flow path and the annular flow path;

d) an inlet for introduction of the sanitizing fluid; and wherein the system further includes:

e) a holster for the nozzle, the holster comprising a drain outlet for discharge of the sanitizing fluid from the nozzle and a nozzle inlet for introduction of the sanitizing fluid into the nozzle;

f) a heater for heating the sanitizing fluid before reaching the nozzle;

g) a controller for controlling the heater; and h) a temperature sensor on the holster for sensing the temperature of the sanitizing fluid, the temperature sensor being capable of providing an output to the controller based on the sensed temperature.

10. The system for cleaning a beverage dispenser of claim 9, further including an interlock and a sensor for preventing the sanitizing fluid flow into the nozzle when the nozzle is not engaged to receive the sanitizing fluid.

11. A system for cleaning a soda gun dispenser comprising a nozzle for receiving at least one beverage and a sanitizing fluid;

wherein the nozzle comprises:

a) a housing having an outer wall and an inner wall with an annular flow path between the inner wall and the outer wall;

b) a central flow path through the nozzle;

c) a connection for fluid flow of the sanitizing fluid between the central flow path and the annular flow path;

d) an inlet for introduction of the sanitizing fluid; and wherein the system further includes:

e) a holster for the nozzle, the holster comprising a drain outlet for discharge of the sanitizing fluid from the nozzle and a nozzle inlet for introduction of the sanitizing fluid into the nozzle;

f) a pump for pumping sanitizing fluid from a sanitizing fluid source to the nozzle;

g) a controller for controlling the pump; and h) a flow rate sensor on the holster for sensing a flow rate of the sanitizing fluid and being capable of providing an output to the controller based on the sensed flow rate.

12. The system for cleaning a beverage dispenser of claim 11, further including an interlock and a sensor for preventing the sanitizing fluid flow into the nozzle when the nozzle is not engaged to receive the sanitizing fluid.

* * * * *